C. R. BACKMANN.
VULCANIZER CARRIER.
APPLICATION FILED OCT. 31, 1908.
926,637.
Patented June 29, 1909.
2 SHEETS—SHEET 1.
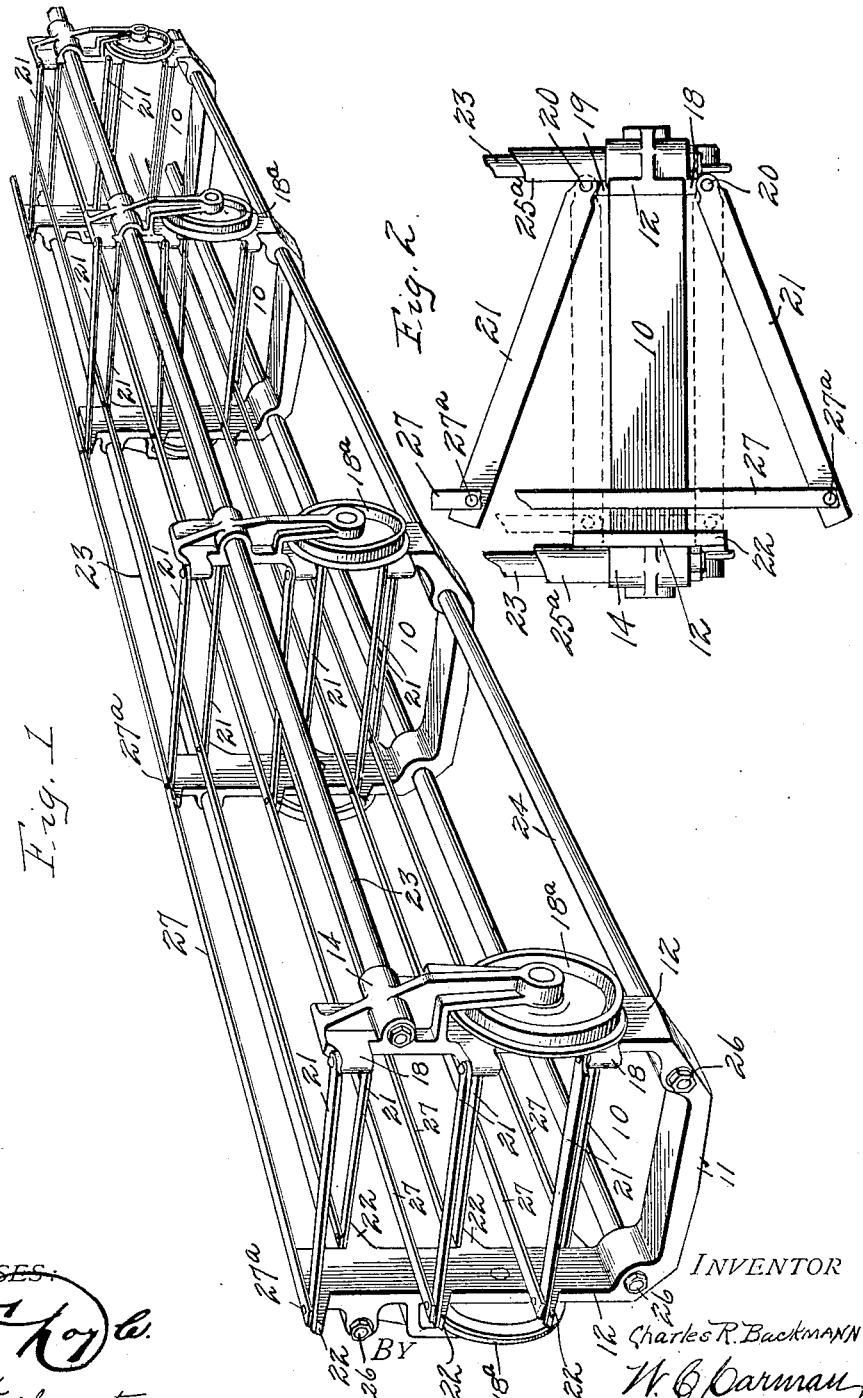
WITNESSES
INVENTOR
Charles R. Backmann
BY W. C. Carman,
Attorney C. R. BACKMANN.
VULCANIZER CARRIER.
APPLICATION FILED OCT. 31, 1908.
926,637.
Patented June 29, 1909.
2 SHEETS—SHEET 2.
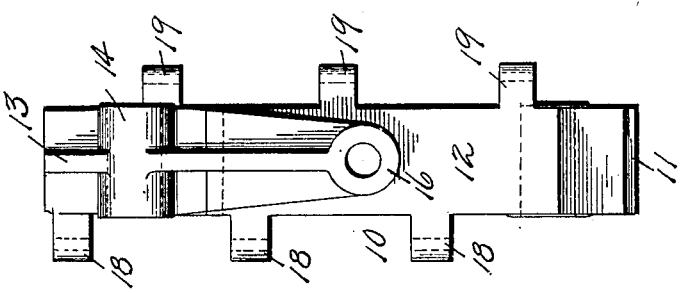
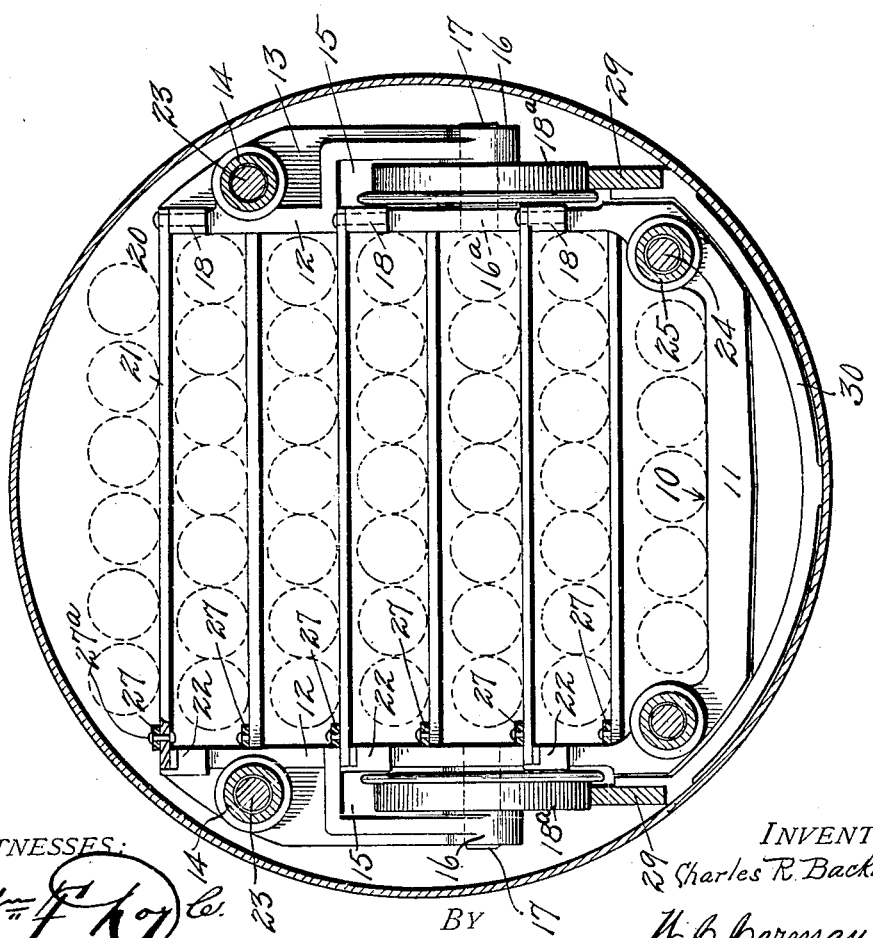
WITNESSES:
INVENTOR
Charles R. Backmann
BY
Attorney

UNITED STATES PATENT OFFICE.

CHARLES R. BACKMANN, OF YOUNGSTOWN, OHIO.

VULCANIZER-CARRIER.

No. 926,637.　　　　　Specification of Letters Patent.　　　Patented June 29, 1909.

Application filed October 31, 1908.　Serial No. 460,413.

*To all whom it may concern:*

Be it known that I, CHARLES R. BACKMANN, a citizen of the United States, residing at Youngstown, in the county of Mahoning and State of Ohio, have invented certain new and useful Improvements in Vulcanizer-Carriers, of which the following is a specification.

This invention relates to the subject of vulcanizing apparatus, and more particularly to the cars or carriers employed for handling the articles to be vulcanized.

To this end the invention contemplates an article carrier or car designed to be wheeled into and out of the vulcanizing chamber or boiler of a vulcanizing apparatus, and possessing special utility as a combined carrier and rack for handling full lengths of rubber hose in the vulcanizing operation; the hose being laid in outstretched condition on the shelves of the carrier after having been wrapped or otherwise made on the usual forming mandrel in the hose making machinery.

Therefore, the general objects of the invention are the provision of a carrier structure of skeleton form which can be readily moved into and out of the vulcanizing chamber, which has a maximum capacity, which permits of a ready loading and unloading of the articles, which provides an efficient support for the articles without materially affecting the heat-application thereto, and which is simple and efficient in operation, durable in construction, and, by reason of duplication of parts, is readily assembled and capable of being manufactured at low cost.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

In the drawings, in which similar reference characters indicate similar parts in each of the views:—Figure 1 is a perspective view of a carrier constructed in accordance with the present invention. Fig. 2 is a top plan view of one end portion of the carrier. Fig. 3 is a vertical cross-sectional view of the carrier mounted within the vulcanizing chamber, the section being taken through the carrier between any two of the supporting frames. Fig. 4 is a side elevation of one of the supporting frames.

The carrier essentially comprises a wheeled skeleton body consisting of a plurality of supporting frames connected together in horizontal alinement, each frame having wheels or rollers for transportation purposes, and each having a plurality of shelves, racks, or equivalent supports pivotally connected thereto, the shelves being arranged to form tiers of horizontally-alined supporting surfaces extending throughout the length of the carrier, the supporting surfaces of each set being operatively connected together to permit of a pivotal movement in unison. The number of supporting frames depends upon the length of the carrier, these frames being similar in all respects, so that the number used depends upon the size of the vulcanizer, and as all of said frames are duplicates, a description of one will suffice for the other.

10 designates a supporting yoke or frame, consisting of a bottom 11 and sides or standards 12, the sides and bottom being connected together, this connection having any preferred configuration on its outer face, dependent upon the shape of the vulcanizing chamber. The frame is substantially U-shaped in front elevation, having an open top. Each side 12 of the frame is provided with an outwardly extending rib, web or fin 13, which, near its top is formed with a longitudinally disposed collar 14, and having its lower part formed with a cut-away portion 15, the rib having its lower end provided with a bearing 16, the opening in which is in alinement with a similar opening 16$^a$ in the side, said openings being adapted to receive the axle 17 of a wheel 18$^a$. The particular manner in which the wheels are supported in their bearings is immaterial, the main feature being that the wheels shall be mounted to have a path of movement parallel with the plane of the inner face of the frame in order that the frame, when connected together will provide for a free movement of the carrier.

One of the frame sides 12 is provided with a plurality of ears 18 and 19, the ears 18 projecting from one edge and the ears 19 from the opposing edge of the side or standard. The said ears are spaced apart in vertical alinement, and the two series of ears presenting a staggered arrangement by reason of being in different horizontal planes, the ears of one series occupying horizontal planes substantially midway of the similar planes of the other series, as plainly shown in Fig. 4 of the drawings. Each of the ears is perforated vertically to receive a pin 20 which serves to connect a strip 21 thereto, the strip having a pivotal swinging movement. The pin 20 may be formed integral with the strip, or the latter may be perforated for the passage of the pin as desired, the purpose being to provide a pivotal mounting for the strip on its ear. The opposite side 12 of each frame is provided with lugs 22 corresponding in position to the ears of the other side, said lugs having their upper faces formed to provide seats for the free ends of the strips when the latter are swung to a position at right angles to the direction of length of the carrier.

The frames are connected together by rods 23 extending through the collars 14, and similar rods 24 extending through collars 25 formed in the connecting portions of the bottom and sides hereinbefore referred to. The rods 23 and 24 are of a length substantially equal to that of the entire length of the carrier, or if the latter is of great length, two or more rods properly secured together in longitudinal alinement may be used. The frames may be positioned on the rods in suitable manner, as by the use of spacing sleeves 25$^a$ (see Fig. 2), the ends of the rods being screw-threaded to receive nuts 26 by means of which the entire structure is tied together. It will be understood that the spacing sleeves may be omitted and the frames positioned by set screws of similar means, but the liability of such form of securing means to become disarranged, together with the ease and rapidity of assembling of the parts when the sleeves are used, makes such structure preferable in use.

The free ends of the strips of each horizontal series or set are connected together by means of a connecting rod 27 pivotally secured to the several strips at 27$^a$, the point of connection being so located that, when the strips are in their operative position, the rods 27 will be adjacent the inner face of the side 12 having the lugs 22 and supporting the free ends of the strips, as shown in dotted lines in Fig. 2. And, as may be the case with the tie rods 23 and 24, the rods 27 may be formed of two or more parts connected together in an obvious manner.

The wheels 18$^a$ are preferably located between the top and bottom planes of the carrier, which not only permits the use of a carrier having a depth almost equal to the diameter of the vulcanizing chamber and a maximum width, but in addition, distributes the load above and below the traction plane, thereby lending stability to the carrier during its movements.

The manner in which the car is positioned within the vulcanizing chamber is illustrated in Fig. 3, in which the vulcanizer is shown conventionally in the form of a boiler, the trackway for the wheels 18$^a$ being formed by two rails 29 extending longitudinally of the boiler and supported by a track support 30 secured at the bottom of the boiler.

The manner in which the carrier is supported when out of the vulcanizing chamber forms no part of the present invention and is not disclosed herein; it will be understood, however, that it is so supported as to permit of its ready movement toward and from the rails 29.

When it is desired to place the hose or other articles in position in the carrier, the strips 21 are all moved pivotally so as to swing them to a position in which their direction of length extends substantially longitudinally of the carrier. This movement of the strips provides the carrier with a practically unobstructed interior space throughout its entire area. The first tier of hose is now laid on the upper face of the bottom 11 (forming the lower shelf of the carrier) in a single row. When this shelf has been "loaded", the lowermost series of strips 21 are moved pivotally to place them in position cross-wise of the carrier, thereby placing a shelf in position to receive the next tier of hose, this latter being located directly above those previously placed in position. Then, the next series of connected strips are moved to operative position and loaded, this operation continuing with the successive positioning of the strips, from the bottom upward, until the entire number of shelves has been loaded, after which the carrier is ready to be placed in the vulcanizing chamber. When the vulcanizing operation has been completed and the carrier withdrawn, the reverse operation takes place, the top tier being removed first, followed by the swinging of its shelf to open position, leaving the succeeding tier free to be withdrawn by simply lifting out the hose; this operation continuing until the carrier has been entirely unloaded.

It will be obvious that where it is not desired to make use of the maximum capacity of the carrier, only those series of strips 21 located above that series on which the lower layer or row is to be placed need be moved to open position. And it will also be understood that should the article be of a size greater than the distance between adjacent strips, the obstructing series may be removed, if desired, by releasing the pivotal connection and withdrawing them from the carrier.

One of the principal advantages of the described construction is the fact that the shelves are movable to positions which leave the interior of the carrier practically unobstructed, thereby permitting of the articles being placed in position through an unobstructed space, there being no contact of the article until it has been positioned over its proper resting points. Furthermore, there is required no movement of the shelves after the articles have been placed in position thereon, so that while the shelves are movable within the carrier, this movement is only for the purpose of removing obstructions in the path of movement of the articles being placed in position, the shelf about to receive the articles which it supports being in its permanent operative position. And, as will be seen from the drawings, the strips 21 are relatively narrow, so that there is a minimum extent of contact surface between the articles and their support.

While I have herein shown and described a preferred form of construction, it will be understood that the same is susceptible to changes and modifications under carrying conditions, and I therefore desire it to be understood that I reserve the right to use any and all such modifications thereof as may fall within the spirit and scope of my invention as expressed in the accompanying claims.

I claim:

1. A carrier of the character set forth, comprising a body having an open top and spaced sides, and a supporting shelf movable in a substantially horizontal plane between a position where it engages and is supported by both sides and a position that leaves an unobstructed space between the sides.

2. A carrier of the character set forth, comprising a body having an open top and spaced sides, and a supporting shelf pivotally mounted on one of the sides and movable in a direction longitudinally of the carrier, into and out of supported engagement with the other side.

3. A carrier of the character set forth, comprising a body having an open top and spaced sides, a supporting shelf pivotally mounted on one of the sides and movable in a direction longitudinally of the carrier, into and out of engagement with the other side, and a seat carried by said other side and detachably receiving and supporting the free end of the shelf.

4. A carrier of the character set forth, comprising a body having open top and spaced sides, a supporting shelf pivotally mounted on one of the sides on a substantially vertical axis and having its free end movable toward and from the opposite side, and a seat carried by said other side to detachably receive and support the free end of the shelf.

5. A carrier of the character set forth, comprising a body having an open top and sides composed of a plurality of spaced standards, a plurality of shelves pivotally mounted respectively on the different standards, and connections between the shelves for effecting their simultaneous movement.

6. A carrier of the character set forth, comprising a body having an open top and sides consisting of a plurality of spaced standards, a plurality of shelves pivotally mounted respectively on the different standards and on substantially vertical axes, and a bar pivotally connected to the free ends of the different shelves for simultaneously moving them.

7. In a carrier of the character set forth, the combination with a body including spaced standards having outstanding ears, of horizontally swinging shelves pivotally mounted on the ears of one standard and having their free ends movable onto and off of the ears of the other standard.

8. In a carrier of the character set forth, the combination with a body including spaced standards having outstanding ears on their opposite sides, of horizontally swinging shelves pivotally mounted on the opposite ears of one standard and having their free ends movable onto and off the correspondingly opposite ears of the other standard.

9. A vulcanizer carrier comprising a body consisting of a plurality of connected upright supporting frames, and a plurality of supporting shelves carried upon opposite sides of each of said frames, the opposite supporting shelves on each frame being arranged in staggered relation in different horizontal planes to provide for supporting separate tiers of the articles to be vulcanized.

10. In a carrier of the character set forth, the combination with spaced standards, of oppositely and horizontally swinging shelves pivotally mounted on the opposite sides of one of the standards and swinging into and out of engagement with the opposite sides of the other standard.

11. A vulcanizer carrier comprising a body consisting of a plurality of connected U-shaped frames, a plurality of shiftable supporting shelves pivotally hung from one of the upright members of each frame, said shelves being arranged in a plurality of sets in different horizontal planes, and means for connecting the shelves of each set for movement in unison.

12. A vulcanizer carrier comprising a body consisting of a plurality of connected upright U-shaped frames, and a plurality of shiftable supporting shelves pivotally hung from one of the upright members of each frame and having a rest engagement with the other upright member of the same frame.

13. A vulcanizer carrier comprising a body consisting of a plurality of spaced, upright open frames, tie connections between the several frames, carrying wheels journaled on the sides of each frame, and shiftable supporting shelves carried by each of said frames.

14. In a carrier of the character set forth, the combination with a body comprising a plurality of substantially U-shaped yokes and longitudinally disposed tie connections between the yokes, of wheels mounted on the outer sides of the standards of the yokes, and swinging shelves pivoted to one standard of each yoke and movable into and out of engagement with the opposite standard.

15. In a carrier of the character set forth, the combination with a body comprising a plurality of substantially U-shaped yokes and longitudinally disposed tie connections between the yokes, said yokes having outstanding ribs on their outer sides provided with depending portions, wheels journaled between the ribs and said sides, the standards of the different yokes furthermore having oppositely extending ears disposed in staggered relation, horizontally swinging shelves pivoted on the ears of one standard of each yoke and movable into and out of engagement with the ears of the other standard of each yoke, and connections between corresponding shelves of the different yokes to effect their simultaneous movement.

In testimony whereof I hereunto affix my signature in the presence of two witnesses.

CHARLES R. BACKMANN.

Witnesses:
HORACE T. SMITH,
H. L. HENDRICKSEN.